United States Patent [19]

le Grand et al.

[11] Patent Number: 4,744,868
[45] Date of Patent: May 17, 1988

[54] DISTILLATION COLUMN AND METHOD

[75] Inventors: Ferdinand le Grand, Gainesville; Carlos E. Odio, Clearwater, both of Fla.

[73] Assignee: University of Florida, Gainesville, Fla.

[21] Appl. No.: 905,537

[22] Filed: Sep. 10, 1986

Related U.S. Application Data

[63] Continuation-in-part of Ser. No. 760,119, Jul. 29, 1985, Pat. No. 4,657,638.

[51] Int. Cl.⁴ .................. B01D 3/24; B01D 3/38
[52] U.S. Cl. ............................ 203/19; 203/96; 203/DIG. 13; 196/100; 196/127; 202/158; 202/234; 208/356; 435/161
[58] Field of Search ............. 202/158, 159, 156, 180, 202/154, 155, 234, 236; 196/98–100, 104, 105, 120, 127; 203/19, 96, 95, 97, 99, DIG. 13, 92, 93, 100; 261/123; 62/42; 208/356, 363; 435/161; 426/494

[56] References Cited

U.S. PATENT DOCUMENTS

| | | | |
|---|---|---|---|
| 102633 | 5/1870 | Wheeler et al. | 203/DIG. 13 |
| 1,857,535 | 5/1932 | Elliston | 202/158 |
| 1,937,958 | 12/1933 | Huff | 202/158 |
| 2,645,467 | 7/1953 | Rupp | 202/158 |
| 3,013,781 | 12/1961 | Haselden | 202/158 |
| 3,151,042 | 9/1964 | Koshoot | 202/174 |
| 3,464,679 | 9/1969 | Becker | 202/158 |
| 4,510,023 | 4/1985 | Bennett et al. | 202/158 |

FOREIGN PATENT DOCUMENTS

| | | | |
|---|---|---|---|
| 837846 | 5/1952 | Fed. Rep. of Germany | 202/158 |
| 416196 | 11/1946 | Italy | 202/158 |

Primary Examiner—Wilbur Bascomb
Attorney, Agent, or Firm—Arthur G. Yeager

[57] ABSTRACT

A stripping column is comprised of one or more mixing channels situated in parallel arrangement, each channel in the form of a zigzag strip through which liquid cascades in a series of falls alternating with a corresponding series of pools. Simultaneously, vapor travels upwardly in a counter-current manner, intimately mixing with the liquid when forced through each successive pool. The column is especially useful in separating alcohol from fermented mash. The column is preferably employed with three other identical columns in a parallelogram structure to make a distillation unit of greater efficiency and capacity.

11 Claims, 2 Drawing Sheets

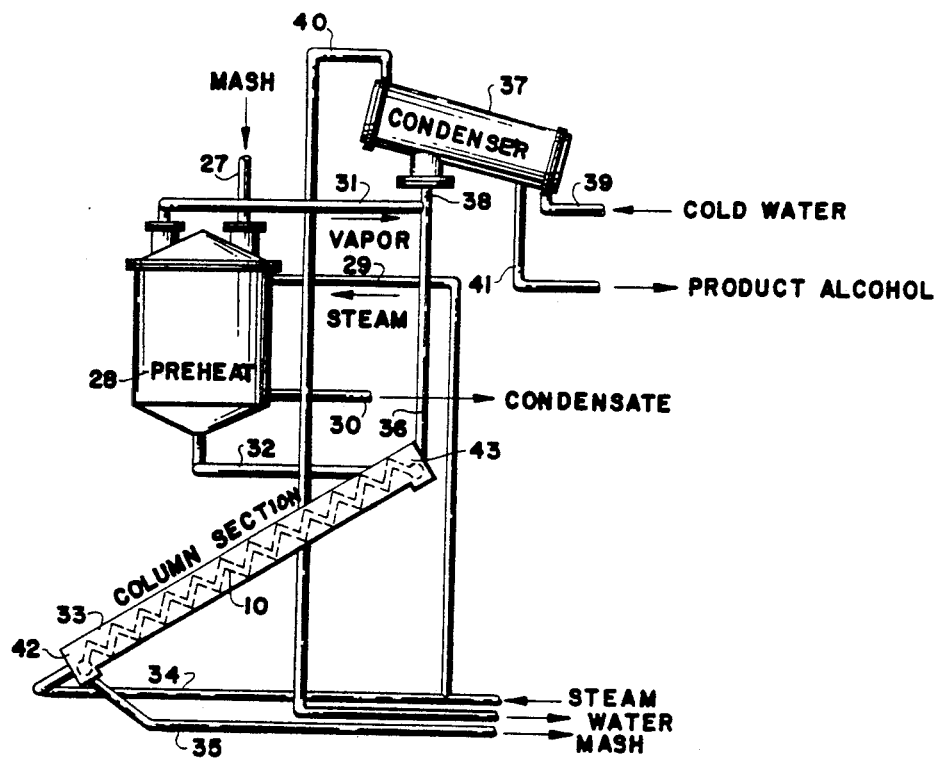
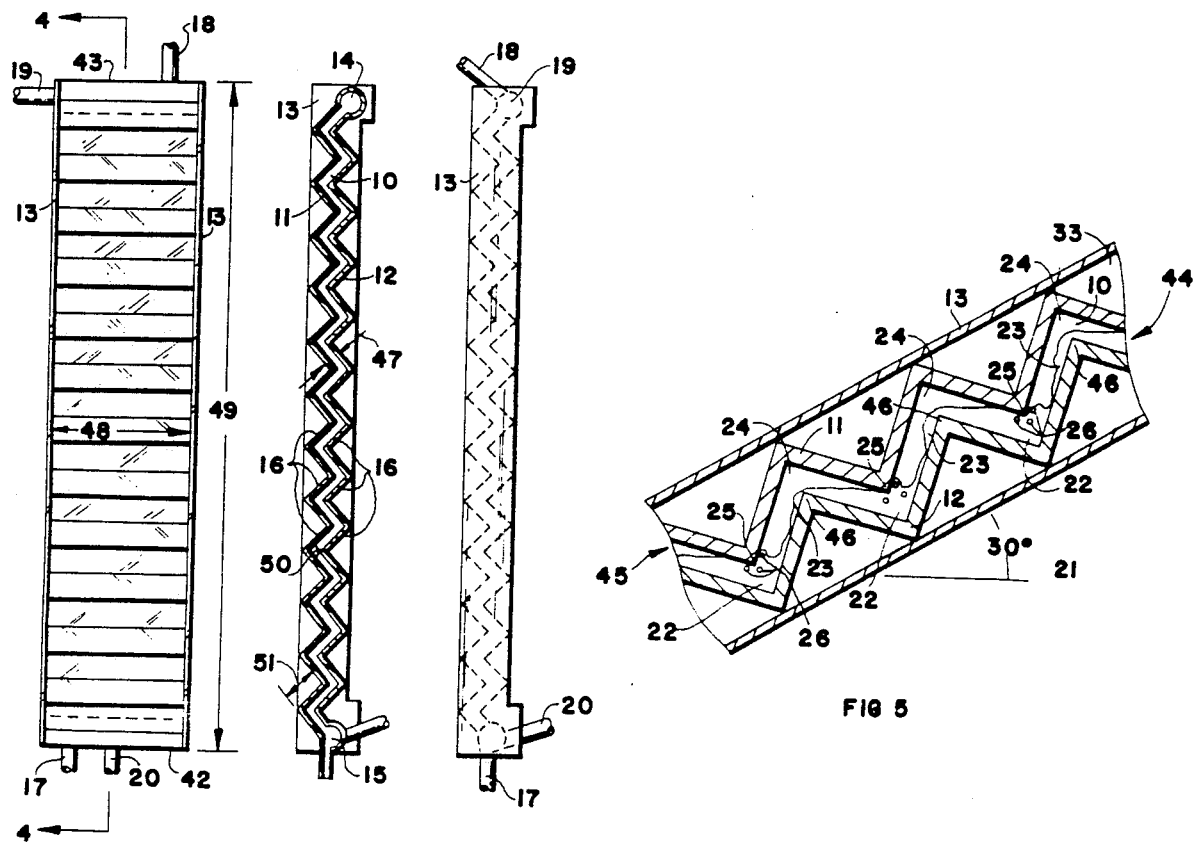

DISTILLATION COLUMN AND METHOD

RELATED APPLICATIONS

This is a continuation-in-part of pending patent application Ser. No. 06/760,119 filed July 29, 1985, now U.S. Pat. No. 4,657,638, which issued Apr. 14, 1987.

BACKGROUND OF THE INVENTION

Columns are well known devices designed to strip desired volatile components from a mixture of liquids often containing solids. Such columns require intimate and continuous contact of vapors moving upwards with liquid moving counter-currently downwards. Different designs for columns have been proposed, including columns packed with Raschig rings, saddles, etc., bubble-cap columns, and other variations designed to cause a continuous mixing and interfacing of downwardly flowing liquid with upwardly flowing vapors so as to cause the maximum amount of volatile components to vaporize in concentrated form from the liquid fed to the column. Such columns are frequently tall (10–15 ft.), and if joined to other equipment (such as a rectifying column), may be part of a single column of 25–35 ft. tall. Because they are so tall and of lightweight construction, these columns are not easy to clean. Boiling-out with caustic solution or strong acid solution together with injection of steam is not feasible because the head pressure of such a tall column of liquid is much too great to be contained by the ordinary column construction. Cleaning, therefore, must frequently be accomplished by dismantling the column and scraping the dismantled internal components to remove the formed encrustations. The cleaning procedures are especially important considerations when the liquid being treated in the column forms a heavy encrustation such as a fermented mash, because the scale which forms readily attaches itself to the surfaces in the column and clogs up the passageways. Need for cleaning is necessarily frequent with such feed stock and down-time may become a significant factor of cost when recovering alcohol from fermented mash.

It is an object of this invention to provide a novel and simple distillation column section which can be readily cleaned. Another object is to provide a distillation column section which is particularly useful in handling a liquid containing scale-forming components. Another object is to provide a novel parallelogram design of four distillation column sections. Still other objects will be apparent from the more detailed description which follows.

BRIEF DESCRIPTION OF THE INVENTION

This invention relates to an inclined distillation column for separating vapor from a fluid mixture containing liquid compounds, comprising a thin enclosed ribbon channel of substantially constant thickness in a stairstep pattern and having an access passageway at each end thereof; said channel defined by two vertically spaced parallel imperforate top and bottom walls defining the thickness thereof and two horizontally spaced parallel imperforate walls defining the width thereof; said channel being a plurality of substantially identical stairstep portions extending from one said access passageway at the top of the column to the other said access passageway at the bottom of the column, each said stairstep portion having a substantially vertical riser surface meeting a substantially horizontal step surface at an angular junction of about 90°; said column being inclined at an angle such that liquid flowing downwardly in said channel collects in a series of pools in said angular junctions of said bottom wall and said corresponding angular junctions of said top wall are submerged in said pools.

This invention also relates to a distillation column for the separation of a vapor from a mixture of liquid and vapor comprising four substantially identical column sections arranged in the shape of a parallelogram symmetrical about a central vertical plane, each column section forming one side of the parallelogram with the two columns on each side of the central plane forming two parallel flow halves of the column, each section having a thin elongated ribbon channel for vapor-liquid flow formed by spaced angularly corrugated top and bottom walls oriented with one end of the channel at an elevation higher than the other end such that the channel will form a series of consecutive pools of liquid flowing downward by gravity, each pool separated from the next adjacent pool by a vapor space through which vapor flows upward, means for introducing a mixture of liquid and vapor enriched with volatile matter at the top of the halves, means for introducing steam at the bottom of the halves, means for removing vapor at the top of the halves, and means for removing liquid exhausted of volatile matter at the bottom of the halves.

This invention also relates to a distillation process for separating volatile components from a multicomponent liquid mass, in which the improvement comprises passing said liquid mass downward through a vapor-liquid contact zone and passing vapor upwards through that contact zone in counter-current flow with the liquid mass which is cascading in a stairstep fashion over a series of falls into a series of pools, consecutively, from one pool to the next lower pool, while vapor is passing upward consecutively through a series of vapor spaces above the pools and falls, each vapor space being totally enclosed above the pool and falls by vapor impervious walls and separated from each adjacent vapor space solely by the downwardly flowing liquid mass, with the only passage for the upwardly moving vapor being through the downwardly flowing liquid mass in the pools and falls.

BRIEF DESCRIPTION OF THE DRAWINGS

The novel features believed to be characteristic of this invention are set forth with specific emphasis in the appended claims. The invention itself, however, both as to its organization and method of operation, together with further objects and advantages thereof, may best be understood by reference to the following description taken in connection with the accompanying drawings in which:

FIG. 1 is a front elevation view of the equipment and the connecting pipe lines used in a distillation procedure to strip alcohol from a feed of fermented mash, in accordance with this invention;

FIG. 2 is a top plan view of a single-tier distillation column section of this invention;

FIG. 3 is a side elevation view of the single-tier column section of FIG. 2;

FIG. 4 is a cross-section taken at 4—4 of FIG. 2;

FIG. 5 is an enlarged view of a portion of the cross-section of FIG. 4 showing how the liquid and vapor is mixed in the process with a single-tier column section of this invention.

DETAILED DESCRIPTION OF THE INVENTION

Figure 6:
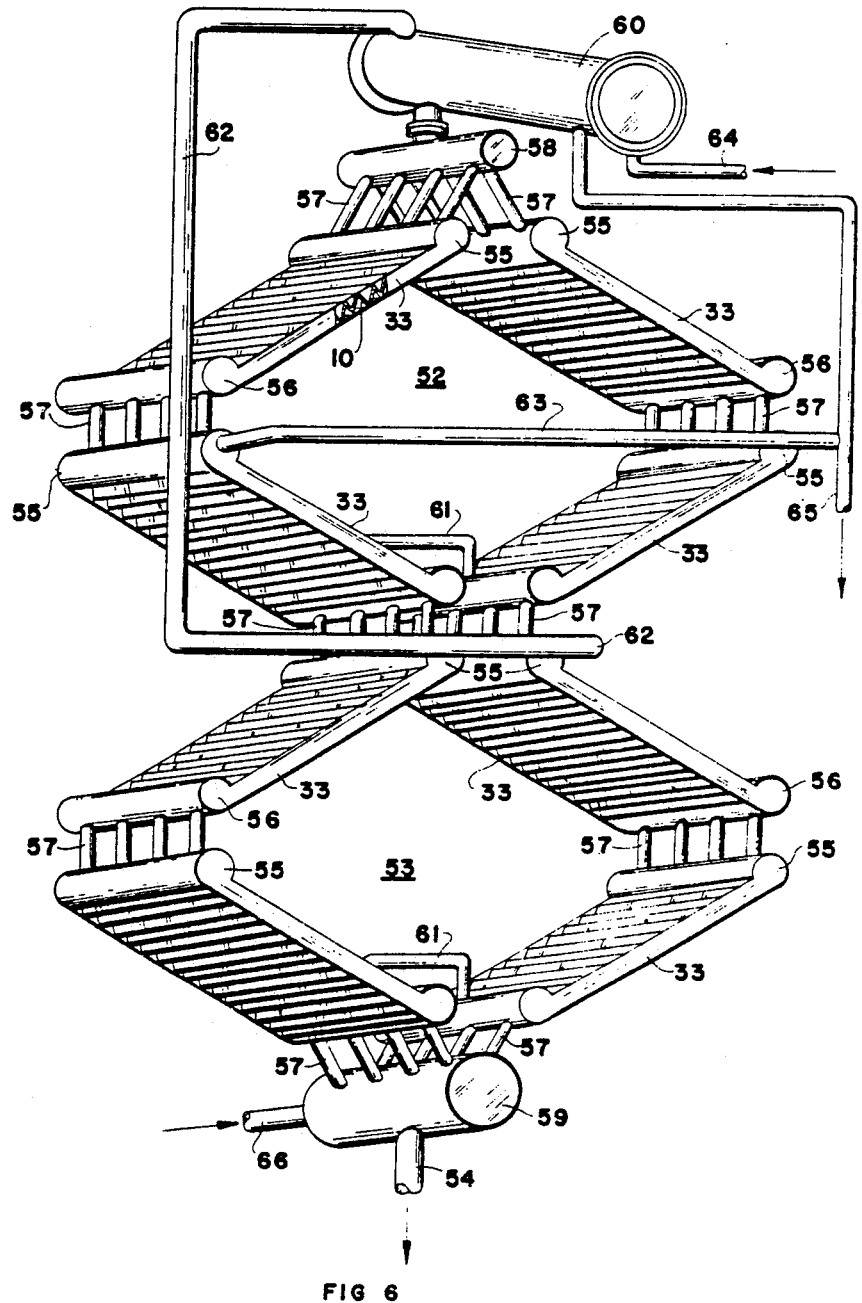
FIG. 6 is a schematic view in perspective of a distillation column of eight column sections arranged in two parallelogram formations.

In FIG. 1 there is shown a processing method using a single-tiered stripping column for treating an aqueous fermented mash to recover alcohol. A typical feedstock is a slurry (mash) of about 20% solids and 80% liquid resulting from the fermentation of corn, rye, barley, or other materials containing simple sugars into alcohol. The liquid component of this mash is a mixture of water and alcohol along with various dissolved, non-fermented sugars and nonsugars. This feedstock is fed into preheater 28 via line 27. Steam is introduced into the heating coil of preheater 28 through line 29 and leaves as condensate through lines 30. The temperature of the mash is raised to about 212 degrees F. in preheater 28 and then fed through line 32 into the top 43 of stripping column 33. The liquid mash flows by gravity downwards through thin ribbon channel 10 to the bottom 42. At the same time steam is fed through line 34 into the bottom 42 of column section 33 and is passed upwardly through channel 10. The steam in channel 10 passes upwardly in intimate contact with the liquid mash flowing counter-currently downwardly, and in so doing, causes the alcohol to vaporize and join the upward flow vapor. The combined water and alcohol vapors exit from column 33 into line 36 leading to condenser 37 where the vapors are condensed to a liquid which is withdrawn through line 41 as the desired product. Condenser 37 is cooled by cold water entering via line 39 and leaving as warm water via line 40. Preheater 28 is connected to line 36 at 38 through line 31 to equilibrate pressure in the preheater 28 and the column section 33. Spent cooling water in line 40, distilled mash in line 35 and condensate from 30 are rejected for further treatment and/or disposal as waste.

The details of column section 33 may be seen in FIGS. 2–4. Column 33 is comprised of a zigzag ribbon channel 10 which is totally enclosed except for entrances and exits at the top 43 and at the bottom 42. At the top 43 there is an exit 18 for vapors leaving channel 10 and an entrance 19 for mash to be fed into channel 10. At bottom 42 there is an entrance 17 for steam to be fed into channel 10 and an exit 20 for mash to leave channel 10. As shown in FIGS. 3 and 4, the top manifold 14 is a passageway to accommodate lines 18 and 19 and connect them to channel 10. Similarly, bottom manifold 15 is a passageway to connect channel 10 to lines 17 and 20. Channel 10 between manifolds 14 and 15 is formed by joining a plurality of angle beams having an L-shape and joined to each other along their two edges to form an angular corrugation similar to stairsteps. Two identical such structures are formed and nested together with a thin space between the two plates to serve as channel 10. Two flat, planar side walls 13 are joined to the spaced corrugations to close channel 10 at each side of the corrugations. The result therefore is a thin ribbon which zigzags in a staircase fashion from top end 43 to bottom end 42.

In FIG. 5 there is an illustration of an enlarged portion of channel 10 as seen in FIGS. 3 and 4 showing how mash and vapor are interfaced throughout the channel. Channel 10 is formed by upper wall 11, lower wall 12 and two sidewalls 13, all walls being imperforate so that all liquid and vapor must flow only in channel 10. The column section 33 is inclined at approximately 30 degrees from the horizontal as shown at 21. Liquid mash flows down column section 33 through channel 10 in the direction of arrow 44. Steam and alcohol vapors flow up column section 33 in channel 10 in the direction of arrow 45. Liquid mash forms miniature falls 23 over each successive upwardly directed edge 46 of lower wall 12, to form a series of pools 22 in the V-shaped basin between adjacent edges 46. The tilting of column 33 to about 30 degrees from the horizontal is sufficient to cause downwardly projecting edges of upper wall 11 to be submerged in respective pools 22. This forms a series of successive vapor spaces 24 above each edge 46 to contain the steam and alcohol vapors moving upwards in channel 10. Because each vapor space 24 is sealed from the next adjacent vapor space 24 by upper wall 11 which is impervious to vapor and by intermediate edge 25 being submerged in pool 24, it is necessary that the vapor develop enough pressure to force its way through the liquid at successive edges 25. This causes a certain amount of bubbling and turbulence 26 around each corner 25 that is advantageous in providing the intimate vapor-liquid contact necessary to produce an efficient separation of volatile matter from the liquid mash.

The structures shown in the drawings are made with angle beams that have legs at 90 degrees apart. This is not a critical angle, but merely a convenience to represent the normal commercially available article. Angle beams with internal angles of greater or less than 90 degrees are operable, although the orientation angle of 30 from the horizontal as applied to the stripping column must be correspondingly modified so as to provide pools 24 with submerged edges 25 as described above.

The distillation column section of this invention may be made of any convenient material, stainless steel being preferred. This column section can be readily cleaned by boiling caustic solution or boiling acid solution since the total head of liquid is small. A pilot-sized experimental column having the following specifications illustrates the invention for a single column section:

| | |
|---|---|
| Width of channel 10 | 12 inches |
| Thickness of channel 10 | 0.5 inches |
| Angle beam legs | 3.0 inches |
| No. angle beams for one wall | 12 |
| Approximate length of column | 54 inches |
| Angle with horizontal | 30 degrees |
| Steam pressure supplied | 5–15 psi |
| 20% solids mash velocity | 3 ft./sec. |
| Temperature of mash at inlet | about 212 degrees F. |
| Alcohol in feedstock | 10% by volume |
| Alcohol in condensate | 30–40%; 0.7 lbs./min. |
| Vapor velocity in column | 0.5–1.0 ft./sec. |
| Working pressure of column | 5–15 psi |

A similar separation would require about 7–10 trays of a bubble-cap column. The cost of the present equipment is about 50% of that of an equivalent bubble-cap column and the operating expenses are estimated to be about 20% of that of the equivalent bubble-cap column.

The distillation column section of this invention has several dimensions that may be varied to suit individual desires. These are shown in FIGS. 2 and 4 as:

| | | |
|---|---|---|
| Channel thickness | 47 | ½" |
| Channel width | 48 | 12" |
| Column length | 49 | 54" |
| Angle beam angle | 50 | 90 degrees |

| | | |
|---|---|---|
| -continued | | |
| Angle beam leg length | 51 | 3" |

These parameters fix the length and volume of channel 10 in a single column section, which, in turn, permits the operator choices of capacity for the column section, liquid velocity, vapor velocity, separation efficiency, etc. Channel thickness 47 is preferably kept small, e.g., about ⅜"–½" so as to maintain continuous, intimate contact between liquid/vapor. Channel width may theoretically be any size, although practicality dictates there may be construction difficulties of maintaining all portions of a large width at exactly the same elevation as all other portions so as to maintain each pool of liquid 22, each fall 23, and each submerged edge 25 at substantially nearly identical elevation across the width 48 of channel 10 so as to prevent any "channeling" of vapor flow along the path of least obstruction, which channeling substantially destroys the distilling efficiency of the column. Widths 48 of three to four feet are preferred. Any required increase in overall capacity for a column can be achieved by using a plurality of column sections in parallel flow pattern. Column length 49 should be maintained within reasonable limits such that the column section can withstand the head of liquid necessary to clean out channel 10 periodically. Preferably, the head should not exceed about six feet which means that the length of column 33 when tilted 30 degrees should be not more than about 12 feet. It is generally preferable to employ short columns which result in correspondingly short heads of liquid in the columns to permit lighter weight construction. This, of course, must be balanced against the use of longer columns to achieve greater separation efficiency. In order to employ a longer channel 10 for a better separation efficiency, two or more columns may be used in series.

Dimensions of the angle beam component employed to construct column 33 are not so critical as the other dimensions described above. Angle beams of stainless steel can be formed commercially in a large number of sizes and angles. Angle 50 is normally 90 degrees. While other angles are operable, such shapes are generally not readily available and do not offer any important advantages over the 90 degrees type. The length 51 of the leg of the angle beam is a matter of choice although larger lengths normally are accompanied by greater thickness and greater weights per unit length of beam. Since increased strength and weight of the beam component are not advantageous, beyond a necessary minimum, it is preferred to employ small beams, e.g., about 3–4" in length for 51. A generalized proportion to relate preferred values of channel thickness 47(T), length of beam leg 51 (L) and width of channel 48 (W) is as follows:

L=8T to 10T
W=9L to 12L
T=⅜ to ¾ inch

Materials of construction for the column are important principally for strength and resistance to corrosion. Materials such as stainless steel or titanium, are preferred, although certain combinations of coated metals are also operable, i.e., glass coated, ceramic coated, and Teflon coated steels are acceptable in many embodiments. Stainless steel, e.g., 304 or 316, is preferred for its combination of ready availability, reasonable cost, and excellent corrosion resistance.

In FIG. 6 there is shown an arrangement of several column sections 33 joined together in a parallelogram formation generally symmetrical about a central vertical plane to provide two distillation columns in parallel flow. In the arrangement of FIG. 6 the upper parallelogram 52 serves as a rectifying section of the total distillation column and the lower parallelogram 53 as the stripping section of the column.

Each column section 33 has a thin ribbon zigzag channel 10 connecting an upper receiver 55 to a lower receiver 56, each receiver functioning as a reservoir to receive the distilling mixture and distribute it for flow into the next component of the column. There may be additional column sections 33 in parallel arrangement connected to receivers 55 and 56 if greater capacity is desired. A plurality of flow pipes 57 join receivers 55 and 56 with the next component. At the top of the column is vapor collector 58 to receive vapor through pipes 57 from the tops of the two column halves. Vapor leaves collector 58 and enters condenser 60 where it is condensed and drawn off through pipe 65 as the desired product.

Condenser 60 is cooled by a cooling liquid entering through line 64 and leaving through line 62. If the cooling liquid is not to be used elsewhere in this distillation column, it is drawn off through a side outlet (not shown) in line 62. In the arrangement shown here, the cooling liquid is the cold feedstock (fermented mash feed, if the column is used to extract alcohol from such a feed) which is fed into condenser 60 through line 64, absorbs heat in condenser 60, and is then fed into middle portion of the column into the receivers 55 at the top of lower parallelogram 53 for removal of volatile matter while flowing downward through the appropriate sections 33 of the column.

When the upper parallelogram 52 serves as a rectifying section of the distillation column it is appropriate to return to the upper parallelogram 52 a liquid reflux to increase the column efficiency in producing a high purified product. In this drawing the reflux liquid is returned through line 63 to the lower receiver 56 or to upper receiver 55 in the middle of parallelogram 52.

At the bottom of the column there is a large liquid collector 59 for receiving the spent liquid which has flowed downwardly through the column. This waste liquid is drawn off through line 54, which has a sufficient siphon effect to keep collector 59 filled with liquid at all times. Steam is admitted through line 66 to provide the heat necessary to cause the vapor component to be volatilized in column sections 33.

In order to equalize the pressure in both vertical halves of the column pipes 61 are connected to two respective lower receivers 56 in each of parallelograms 52 and 53. This assures that each vertical half of the column will function similarly to the other vertical half.

It is to be understood that other parallelogram formations of four column sections 33 can be connected to the ones shown in FIG. 6 to add to the capacity or add to the distillation efficiency. If more capacity is needed, an identical parallelogram can be connected in parallel flow pattern to vapor collector 58 and liquid collector 59. If a greater separation efficiency between vapor and liquid is required, one or more additional parallelogram formations can be added in a vertical direction so there are 6, 8 or more column sections 33 in series between collectors 58 and 59.

It is preferred that the construction of parallelogram sections be accomplished by welding after careful leveling of all components so that liquid flow and liquid levels will be substantially identical across the width of every column section 33.

Other uses for the distillation column of this invention include nearly any separation of low boiling components from a mixture of liquids. Separation of petroleum fractions, separation (scrubbing) of solids in gaseous form from other gases, purification of various solvents, recovery of alcohol from solutions, recovery of volatile oils (flavor components) from agricultural commodities, etc., are feasible with the column of this invention. A most important use for this column is believed to be the stripping of a valuable vaporizable component from a mixture of liquids and solid plant residues having calcium and magnesium salt components, because of the ease with which this column may be cleaned of encrustations by use of a boiling solvent.

The invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. In a distillation stripping process for separating volatile components from a multicomponent liquid mass, the improvement which comprises passing said liquid mass downward through a vapor-liquid contact zone and passing vapor upward through said zone in counter-current flow with said liquid mass; said vapor being a mixture of steam introduced into the lower end of said zone and the vaporous product resulting from heating said liquid mass by means of said steam, said liquid mass cascading over a series of falls into a series of pools, consecutively, from one pool to the next lower pool, and said vapor passing upwardly consecutively through a series of vapor spaces above said pools and falls, each said vapor space being totally enclosed above said pool and falls by vapor impervious walls and separated from each adjacent vapor space solely by said downwardly flowing liquid mass, with the only passage for said upwardly moving vapor being through said downwardly flowing liquid mass in said pool and falls.

2. The process of claim 1 wherein said vapor-liquid contact zone is a thin stairstep channel having a longitudinal cross section in the shape of saw teeth.

3. The process of claim 1 wherein said multicomponent liquid mass contains a liquid component, a solid component, and a vapor component.

4. The process of claim 3 wherein said liquid mass is an aqueous mixture of fermented mash.

5. The process of claim 3 wherein said liquid mass is a petroleum stock having low boiling components therein.

6. The process of claim 3 wherein said solid component includes salts of calcium or magnesium.

7. An inclined distillation stripping column for separating vapor from a fluid mixture containing liquid components, comprising an enclosed thin ribbon channel of substantially constant thickness in a stairstep pattern and having an access passageway at each end thereof; said channel defined by two vertically spaced parallel imperforate top and bottom walls defining the thickness thereof and two horizontally spaced parallel imperforate side walls defining the width thereof; said channel being a plurality of substantially identical stairstep portions joined to each other from one access passageway at the top of the column to the other access passageway at the bottom of the column, each said stairstep portion having a substantially vertical riser surface meeting a substantially horizontal step surface at an angular junction of about 90°; said column being inclined at an angle such that liquid flowing downwardly in said channel collects in a series of pools in said angular junction of said bottom wall and said corresponding angular junctions of said top wall are submerged in said pools.

8. The column of claim 7 wherein said column is inclined at an angle of approximately 30° from the horizontal.

9. The column of claim 7 wherein the length of said riser surface and the length of said step surface measured parallel to said side walls is substantially equal.

10. The column of claim 7 wherein said thickness (T) of said channel is proportionate to said length (L) of said step surface in accordance with the formula: $L = 8T$ to $10T$.

11. The column of claim 10 wherein said width (W) is in the proportion $W = 9L$ to $12L$.

* * * * *